United States Patent [19]

Fey et al.

[11] 4,220,232
[45] Sep. 2, 1980

[54] TWO-SPEED DRIVE

[75] Inventors: Robert M. Fey; Hiriyur V. Shekar, both of Louisville, Ky.

[73] Assignee: General Electric Company, Louisville, Ky.

[21] Appl. No.: 930,487

[22] Filed: Aug. 2, 1978

[51] Int. Cl.² ............................................. F16D 43/24
[52] U.S. Cl. .................................. 192/103 B; 192/26; 192/48.3; 192/104 C
[58] Field of Search ..................... 192/48.3, 26, 103 B, 192/104 C

[56] References Cited

U.S. PATENT DOCUMENTS

| | | | |
|---|---|---|---|
| 2,869,699 | 1/1959 | Bochan | 192/48.3 |
| 3,131,797 | 5/1964 | Bochan | 192/103 B |
| 3,324,984 | 6/1967 | Brame | 192/104 C |

*Primary Examiner*—Henry Jaudon
*Attorney, Agent, or Firm*—Radford M. Reams

[57] ABSTRACT

A two-speed clutch drive system for a multi-speed basket and agitator drive for washing machines, including primary and secondary clutches interposed in series between an input drive shaft and an output member, both mounted concentrically with respect to an inner drum. The primary clutch is a centrifugally-operated system to establish drive between the input shaft and the inner drum, while the secondary clutch establishes drive between the inner drum and the output member. The secondary clutch includes clutch shoes spring-operated to directly transmit the torque to the output during high speed operation. Low speed drive is established by engagement of pivotally mounted auxiliary weights with clutch shoes acting to reduce the engagement pressure with increasing speed, yielding a reduced speed drive through the system by slippage of the secondary clutch. Pivotally mounted triggers control the release of the auxiliary weights and are positioned so as to be struck by a shifter mechanism engagement tab to be rotated to release the weights. Positive stops prevent overtravel of either the triggers or the auxiliary weights during shifting to low speed. The secondary clutch operator springs are mounted to stationary pedestals designed to enable easy installation, while the anchoring of the trigger and weight return springs is to integrally formed bosses, slotted to accept the looped end of the springs.

13 Claims, 7 Drawing Figures

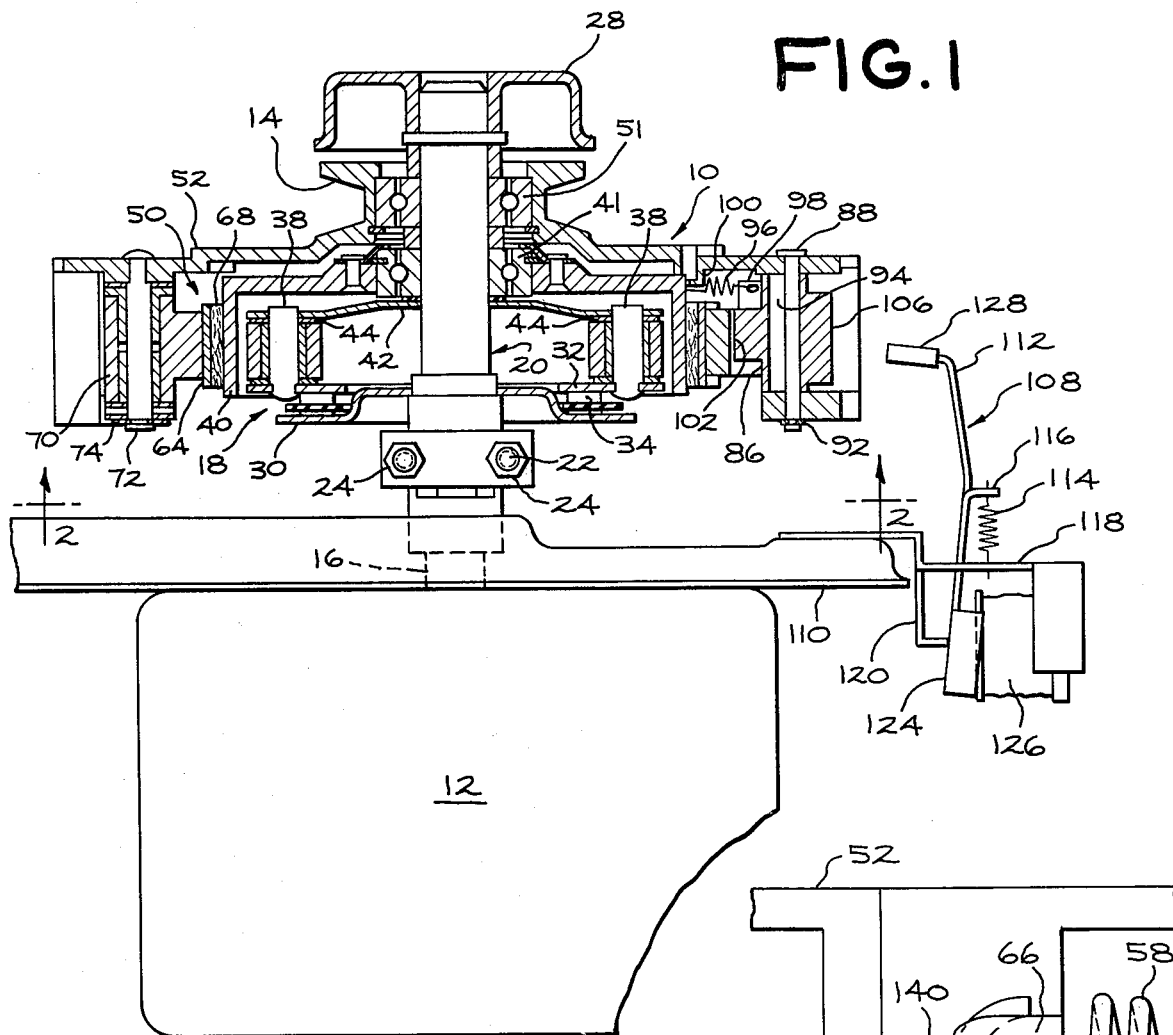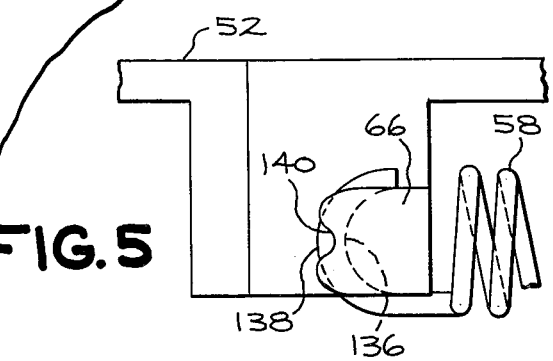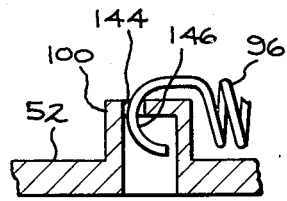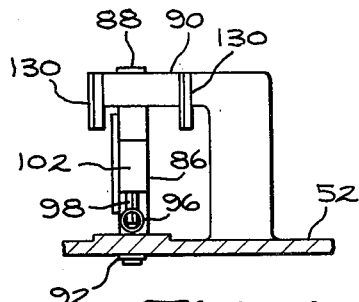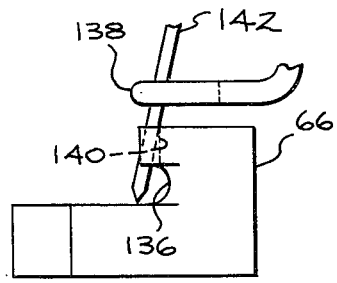

TWO-SPEED DRIVE

BACKGROUND DISCUSSION

This invention concerns multi-speed drives and more particularly clutch drive units which are capable of producing drive through the unit at a one-to-one or direct drive ratio and also at a reduced rate in which slippage between the input and output is maintained to produced a reduced speed output.

Most modern washing machine designs require the use of multi-speed drives for rotation of the clothes receiving basket during spin/extract cycles and also varying speed oscillation of the agitator to adapt the machine to the effective washing of various fabric types. The torque-speed requirements of the clutch vary considerably since the drive unit is heavily loaded while initiating oscillation of the agitator with a full load of water and clothes, but is relatively lightly loaded in spinning the basket during extract cycles. The electric motor utilized as the source of rotative power must be protected from overload upon start up for these widely varying load conditions.

Very satisfactory drive units for such applications have heretofore been provided by two-speed, speed-responsive clutch systems in which the motor shaft drives a series of clutches. Such clutch systems enable torque-speed responsive clutching action to enable slippage between the motor shaft and the output drive member during start up to protect the motor from overload and yet provide adequate torque capacity at the design rotational speed.

These clutch systems have also included secondary clutches which are selectively caused to be brought into operation, which operate so that the output member is driven at a lower speed by virtue of a slippage of the clutch system at the design rotational speed of the input member.

Such two-speed clutch drive units, ae described in U.S. Pat. Nos. 2,869,699 to Bochan and 3,324,984 to Brame, both of which patents are assigned to the assignee of the present application.

In the Bochan arrangement, the clutch system includes a primary centrifugally actuated clutch in which the input shaft drives a pair of pivotally mounted clutch shoes which move outwardly into engagement with the inner surface of an inner drum. The inner drum in turn is caused to be drivingly engaged with an outer drum which is connected to the output drive member by either of a pair of secondary clutches.

The first secondary clutch is activated during high speed or direct drive operation through the clutch drive unit. During low speed drive, an inversely speed responsive clutch system is caused to be activated in which the torque capacity thereof is reduced with increasing speed of rotation. Thus, slippage is established at a predetermined speed-torque level to thereby achieve the lower speed drive.

While this design operates very admirably and reliably for such applications, it is relatively complex in that three different clutches are required and also a heavy carrier plate is necessitated in order to provide an intermediate mounting structure for both of the secondary clutch sets. In addition, the use of two differing secondary clutches increases the overall depth of the clutch unit. This relatively great depth precludes the location of the U-clamp assembly beneath the clutch, necessitating the assembly of the motor and clutch as a single assembly.

Since the components of such clutch units are often fabricated of die cast zinc and zinc fluctuates widely in price, the extra components required which would be constructed of such materials could introduce a significant cost penalty in times of high market prices for zinc.

The arrangement shown in the Brame patent discloses a variation in this basic design in which only a single secondary clutch is incorporated. In this arrangement, the secondary clutch includes a pair of slidably movable clutch shoes which are spring-applied and which engage the outer drum by means of fingers slidably moving through openings in the outer drum. In high speed operation, the spring application of the clutch shoes establish one-to-one drive between the inner drum and the outer drum.

In order to produce a reduced speed drive, a pair of auxiliary weights are similarly slidably mounted to the outer drum and are caused to be released so as to apply a centrifugally generated disengagement force on each of the shoes which is so designed to produce slippage at a predetermined rotational speed and torque level. Thus, this obviates in some respects the drawbacks of the two-speed drive described in the Bochan design in that only a single secondary clutch is utilized and the number of components is accordingly reduced.

However, the slidable mounting of the secondary clutch shoes and the auxiliary weights creates a tendency to produce a relatively high noise level during operation, since these components must be allowed to slide freely and thus cannot be mounted tightly such that vibration of the parts can be avoided.

Another factor in the cost of the clutch units is the ease with which the various components may be assembled. The various operating springs incorporated in these designs often are relatively difficult to install, particularly for the heavy clutch engagement springs in which significant substantial force is required in order to slip the anchoring loop of the spring over the mounting pedestal.

For the lighter return springs, a significant cost was often entailed in the requirement for a separate machined boss to be formed in the mounting structure with a separate pin seated in a machined hole in the boss required to order to anchor the spring.

It is accordingly an object of the present invention to provide a two-speed drive of the type described in which only a single primary and secondary clutch are required and in which the mounting of the various components is relatively tight such that noise is avoided during the operation of the clutch.

It is yet another object of the present invention to provide such clutch drive units incorporating coil spring components in which mounting arrangements are provided which simplify assembly of the clutch engagement spring and also simplify the arrangement required to anchor the return springs.

SUMMARY OF THE INVENTION

These and other objects of the present invention, which will become apparent upon a reading of the following specification and claims, are accomplished by a two-speed clutch system including a primary and secondary clutch, interposed between the input drive member and the output drive member. The primary clutch system is comprised of centrifugally actuated radially movable clutch shoes driven by the input shaft and establishing drive to the interior of an inner drum. The secondary clutch comprises clutch shoes pivotally mounted on the output member and spring biased into engagement with the outside diameter of the inner drum to thereby establish drive from the input drive shaft to the output drive member with the primary and secondary clutches in series in the system.

Auxiliary weights are provided which are pivotally mounted to the output member and adapted to be controllably released so as to move into engagement with a respective secondary clutch shoe under the influence of centrifugal force and to reduce engagement of secondary clutch shoes with increasing rotational speed such as to provide a reduced output speed of the driven member at the design torque level.

The control over the release of auxiliary weights is carried out by pivotally mounted triggers which are spring biased into position in which a nose portion is in engagement therewith, restraining the auxiliary weights from outward movements during high speed operation, but which are released by the impacting portion of the shifter arm when the shifter is electrically energized and moved into position to strike a tail portion on the triggers. This rotates the triggers out of position to release the auxiliary weights. Limit stops control the extent of releasing rotational movement of the triggers to prevent malfunction by overtravel of the triggers. Limit stops are also provided to limit the extent of outward movement of the auxiliary weights and also preclude malfunctions caused by the excessive outward travel of the auxiliary weights.

The use of the pivotal mounting of the auxiliary weights and the secondary clutch shoes enables relatively secure positioning of the secondary clutch shoes and auxiliary weights during the course of their motion such as to eliminate vibration and reduce the noise level during clutch operation.

An arrangement is provided for anchoring the secondary clutch springs which will enable the coil springs to be secured to the mounting pedestals by means of a simple tool. Also provided is a spring mounting pedestal comprised of an integrally formed boss extending upwardly from the driven member flange, each having a slotted opening such that the looped end of the trigger and weight return springs may be anchored by insertion into the slotted openings to securely retain the same.

DESCRIPTION OF THE DRAWINGS

FIG. 1 is an elevational view in partial section of a two-speed clutch system incorporated into a drive unit according to the present invention, together with a drive motor.

FIG. 4 is a view taken in the direction of the arrows 4—4 of FIG. 2.

FIG. 5 is an enlarged view of the two-speed clutch system taken in the direction of arrows 5—5 in FIG. 3.

FIG. 6 is an enlarged fragmentary view depicting the assembly of the secondary clutch shoe springs to the mounting pedestals by the use of a tool.

FIG. 7 is a sectional view taken along the lines 7—7 in FIG. 3.

DETAILED DESCRIPTION

Figure 2:
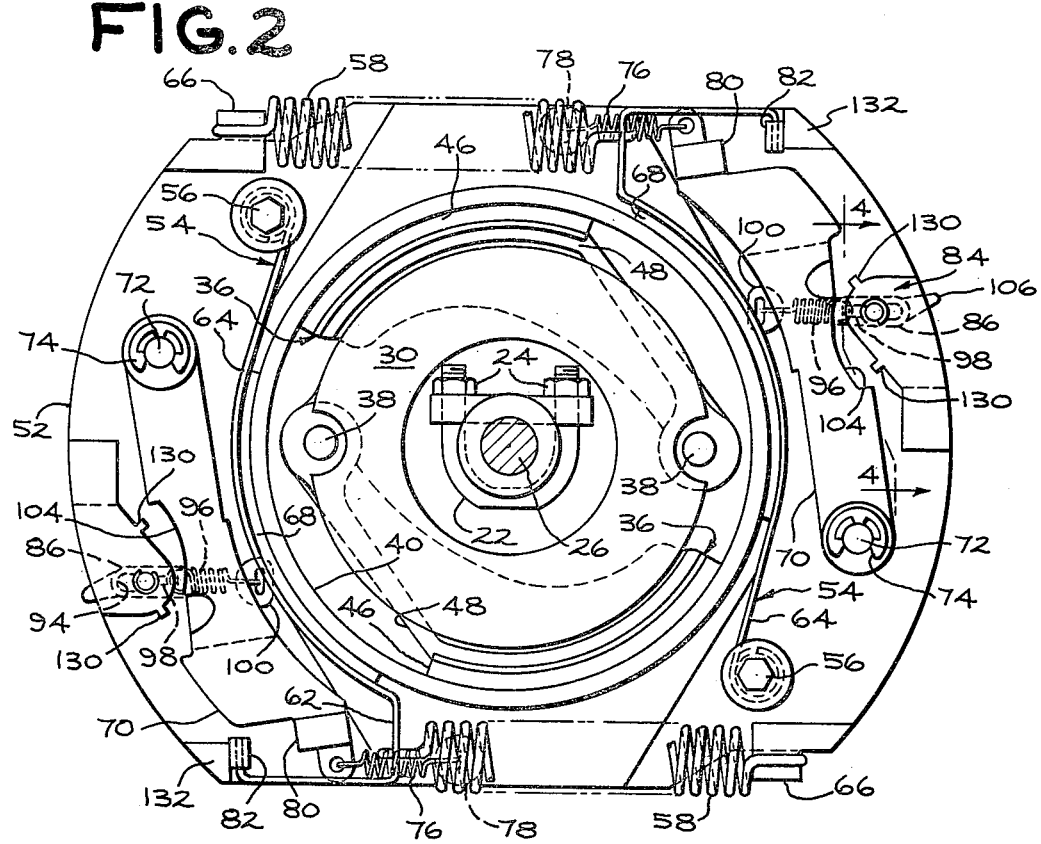
FIG. 2 is a view of the section 2—2 taken through the two-speed clutch system shown in FIG. 1.

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly to FIG. 1, the two-speed clutch system 10 is adapted to be driven by an electric motor 12 and in turn rotate an output member comprised of a pulley wheel 14 at a direct drive ratio with the motor output shaft 16 of the motor 12, or at a reduced rate depending on the operating condition of the two-speed clutch system 10.

Such a general arrangement is commonly employed in modern-day washing machines in which the output pulley wheel 14 is engaged by a belt drive to rotate a transmission (not shown) which serves to control the drive to the washing machine basket for spin/extract cycles or the agitator during wash or rinse cycles. Such machines are often designed to accommodate different fabric types such that varying speeds of oscillation of the agitator and also spin of the basket are provided appropriate to these differing fabric types.

The motor 12 is therefore required to start up under widely varying load conditions, i.e., the driving of the agitator with a full load of water creates a relatively heavy start up load on the motor 12, whereas initiation of the basket spin with a relatively low water level imposes only a relatively light load on the motor 12.

For this reason, the two-speed clutch system 10 must allow the output shaft 16 to slip during initial start up under heavy loads to prevent motor overloads and thereafter achieve the full torque capacity required as the output pulley wheel 14 is accelerated to the corresponding speed of rotation of the output shaft 16.

Such requirements have in the past been very satisfactorily met by the use of a centrifugal drum type clutch unit which here forms the primary clutch 18.

The primary clutch 18 includes a shaft extension assembly 20 which is adapted to be slid onto the output shaft 16 at assembly and a U-clamp 22 secured by nuts 24 providing a secure connection of the shaft extension assembly 20 thereto. This provides a rotational mounting of the shaft extension assembly 20 by the output shaft 16 bearings.

Shaft extension assembly 20 includes a central shaft 26 extending through the two-speed clutch system 10 and which may also be utilized to drive the washing machine water circulation and drain pump (not shown) by means of a connection to an end cap 28 which may serve to have a flexible drive connection secured thereto to drive the input of the water circulation pump.

Staked to the central shaft 26 is a carrier plate 30 comprising the input member of the primary clutch 18, which is secured to a clutch holder plate 32 by means of an isolation vibration elastomer coupling 34, bonded to both the carrier plate 30 and the clutch holder plate 32.

The clutch holder plate 32 mounts a pair of clutch shoe assemblies 36 (FIG. 2) on a pair of pivot pins 38. The clutch shoe assemblies 36 are pivotally movable about the pivot pins 38 such as to be radially movable into clutching frictional engagement with the interior surface of an inner drum 40 which forms the output member of the primary clutch 18. The inner drum 40 is rotatably supported on bearing 41 and "floats"; that is, is not directly connected for rotation with the other components, but rather is either driven or drives only through the engagement of the primary clutch 18 or the secondary clutch to be described.

The clutch shoe assemblies 36 are biased downwardly against the clutch holder plate 32 by means of a pressure arm 42 having end portions received over the pivot pins 38 and acting on thrust washers 44 urging the clutch shoe assemblies 36 downward as viewed in FIG. 1, such as to minimize vibrations.

Each of the clutch shoe assemblies 36 includes a clutch engagement surface comprised of a lining 46 secured to the clutch shoes 48, as per conventional design practice.

Such an arrangement as is provided by the primary clutch 18 exhibits all the necessary characteristics required of the application described, i.e., the torque is positively responsive to rotational speed. That is, the torque capacity increases with rotational speed of the central shaft 26 due to the centrifugal force acting on the clutch shoe assemblies 36 urging them into tighter engagement with the inner drum 40. The primary clutch 18 tends to slip on start up and gradually increases the load on the motor 12 until the operating speed is achieved, with the proper torque transmission through the primary clutch 18 achieved at this speed.

In addition, the relationship of the clutch shoe assemblies 36 and the pivot pins 38 produces a directionally responsive varying torque capacity of the clutch. In such washing machine designs, the motor 12 is designed to be reversible and the reversing of the motor 12 produces a change in the drive of the transmission from agitation to spin. The greater torque requirements required for agitation are advantageously met by establishing agitation drive during counter clockwise rotation as viewed in FIG. 2. This rotation produces a self-energizing effect when the clutch shoe assemblies 36 are leading the pivot pins 38 during the counter clockwise rotation of the central shaft 26, such as to increase the torque capacity.

In order to provide a multi-speed capacity for the two-speed clutch system 10, the inner drum 40 is not directly coupled to the output pulley wheel 14 as noted above, but rather there is interposed in series with the primary clutch 18 a secondary clutch 50. This secondary clutch 50 serves to establish rotary drive from the outside diameter of the inner drum 40 (forming the input member of the secondary clutch 50) and a pulley plate 52 integral with the output pulley wheel 14 (forming the output member of the secondary clutch 50). The pulley plate 52 is rotatably mounted on the central shaft 26 by a bearing 51 which is aligned with the output pulley wheel 14.

The secondary clutch 50 directly couples the inner drum 40 to the pulley plate 52 in one mode of operation, in which the output pulley wheel 14 is to be driven at a one-to-one or direct drive ratio with the central shaft 26. In a second mode, slippage is allowed therebetween at a controlled, predetermined rate at a given torque level to thereby provide a reduced output rotational speed of the output pulley wheel 14 relative to the output shaft 16, in order to achieve the purposes described above.

The secondary clutch 50 includes a pair of clutch shoe assemblies 54, each pivotally secured at one end to pivot pins mounted to the pulley plate 52. Each of the free ends of the clutch shoe assemblies 54 is operatively engaged with a tension operating spring 58 secured at one end to an extension 62 of the clutch shoe 64 forming a part of each of the clutch shoe assemblies 54.

The tension operating springs 58 are anchored at their other ends to pedestals 66 integral with the pulley plate 52.

The tension operating springs 58 serve as a bias means to urge the clutch linings 68 into frictional clutching engagement with the outside diameter of the inner drum 40.

It can be seen that the effect of rotation of the pulley plate 52 is such as to cause the secondary clutch 50 to be inversely speed responsive. That is, the clutch shoe assemblies 54 have a tendency to be rotated radially outwardly about the pivot pins 56 to reduce the engagement pressure with the outside diameter of the inner drum 40. However, the engagement force exerted by the tension operating spring 58 is designed to be sufficient such that, given the relatively low mass of the clutch shoes 64, the torque capacity of the secondary clutch 50 is adequate to overcome the effects of centrifugal force and still carry the complete torque transmitted by the primary clutch 18, insuring an overall one-to-one drive through the two-speed clutch system 10.

In order to enhance the inverse torque-speed characteristic of the secondary clutch 50, a system of pivotally supported auxiliary weights is incorporated including auxiliary weights 70 which are pivotally supported at one end by means of pins 72 mounted to the pulley plate 52 at one end. The auxiliary weights 70 are retained by the snap retainers 74 to provide a means for pivotally mounting the auxiliary weights 70 to the pulley plate 52 so as to accommodate radial movement during low speed operation of the two-speed clutch system 10.

The pivotal movement of each of the auxiliary weights 70 is restrained by a relatively low strength return spring 76 which is secured to the free end of each of the auxiliary weights 70 and anchored at the other end to a mounting boss 78 in a manner as will be described in further detail hereinafter, such as to maintain the auxiliary weight 70 in its radially inmost position during initial start up. Each of the auxiliary weights 70 is formed with an engagement surface 80 which is adapted to engage an outer release tab 82 formed on each of the clutch shoes 64 upon continued radial outward movement of the auxiliary weights 70 under the influence of centrifugal force.

When the engagement surface 80 engages the outer release tabs 82, the centrifugal force exerted thereon with respect to auxiliary weights 70 reduces the engagement pressure exerted by the tension operating springs 58, which force increases with increasing rotational speed, the net effect being a speed limiting feature such that at a given torque level, the rotational speed of the output pulley wheel 14 is stabilized at a reduced rotational rate from that of the output shaft 16.

According to the concept of the present invention, the pivotal mounting of the clutch shoe assemblies 54, as well as auxiliary weights 70, is such that vibration is eliminated to thereby obviate the disadvantages of the arrangement shown in U.S. Pat. No. 3,324,984.

The auxiliary weights 70 are configured such that there is a greater proportion of the mass of the weights at the free or outboard end thereof to enhance the centrifugal disengagement force generated at a given rotational speed.

The movement of each of the auxiliary weights 70 is restrained during high speed operation such that the auxiliary weights 70 will not be allowed to act on the respective clutch shoe assemblies 54. This restraint is carried out by a pair of trigger assemblies 84, each including a trigger element 86 pivotally mounted to the pulley plate 52 by means of pivot pins 88 passing through the pulley plate 52 at one end and secured at the other end to a pedestal 90 cast integrally with the pulley plate 52 (FIG. 4). Each pivot pin 88 is retained by a suitable snap retainer 92.

The pivot pins 88 pass through elongated slots 94 formed in each trigger 86, which slots 94 accommodate a radially outward movement of the triggers 86 under the influence of centrifugal force. This movement is resisted by a pair of tension return springs 96, which are anchored to a tab 98 at one end and to an anchoring boss 100 at the other in similar fashion to the auxiliary weight return springs 76.

Each trigger 86 is formed with a nose portion 102 which is normally engaged with a lateral surface 104 formed on each respective auxiliary weight 70, which serves to resist the outward movement of the auxiliary weights 70. Upon acceleration of the inner drum 40, the auxiliary weights 70 and the triggers 86 move radially outward against the inward radial bias of the return springs 76 and 96 to an extent accommodated by the slots 94 until the pivot pins engage the radially inmost end of the elongated slots 94. At this point, the tail portion 106 formed on each of the triggers 86 protrudes beyond the periphery of the pulley plate 52 as shown in FIG. 2.

If high speed operation is indicated, further radially outward movement of the auxiliary weights 70 is prevented by the bottoming out in the slots 94 and the clutch shoe assemblies 54 remain uninfluenced by the auxiliary weights 70.

If low speed operation is indicated, control means comprised of a shifter mechanism 108 is activated.

The shifter mechanism 108, which is mounted to a support plate 110, to which is also mounted the motor 12, includes a shifter arm 112 which is biased to the position shown in FIG. 1 by means of a return spring 114 secured to a tab 116 at one end and to a base plate 118 at the other.

The shifter arm 112 is mounted at one end to a bracket 120 extending to the base plate 118 and having a U-shaped armature element 124 affixed thereto which is positioned opposite an electromagnetic coil 126, which when energized, causes the shifter arm 112 to be pivoted about the bracket 120 against the return spring 114, to move an engagement tab 128 into closer proximity to the outer perimeter of the pulley plate 52.

In the unenergized condition, the position of the engagement tab 128 is such that there remains a gap between the tail portion 106 as it protrudes after the initial radial outward movement indicated in FIG. 2.

Upon movement of the shifter arm 112 to closer proximity, the engagement tab 128 is positioned to successively strike the protruding tail portions 106, pivoting them about their respective pivot pins 88 causing the nose portions 102 to be moved out of engagement with the lateral surfaces 104. This enables the auxiliary weights 70 to move radially outwardly by pivoting about their respective pivot pins 72.

Figure 3:
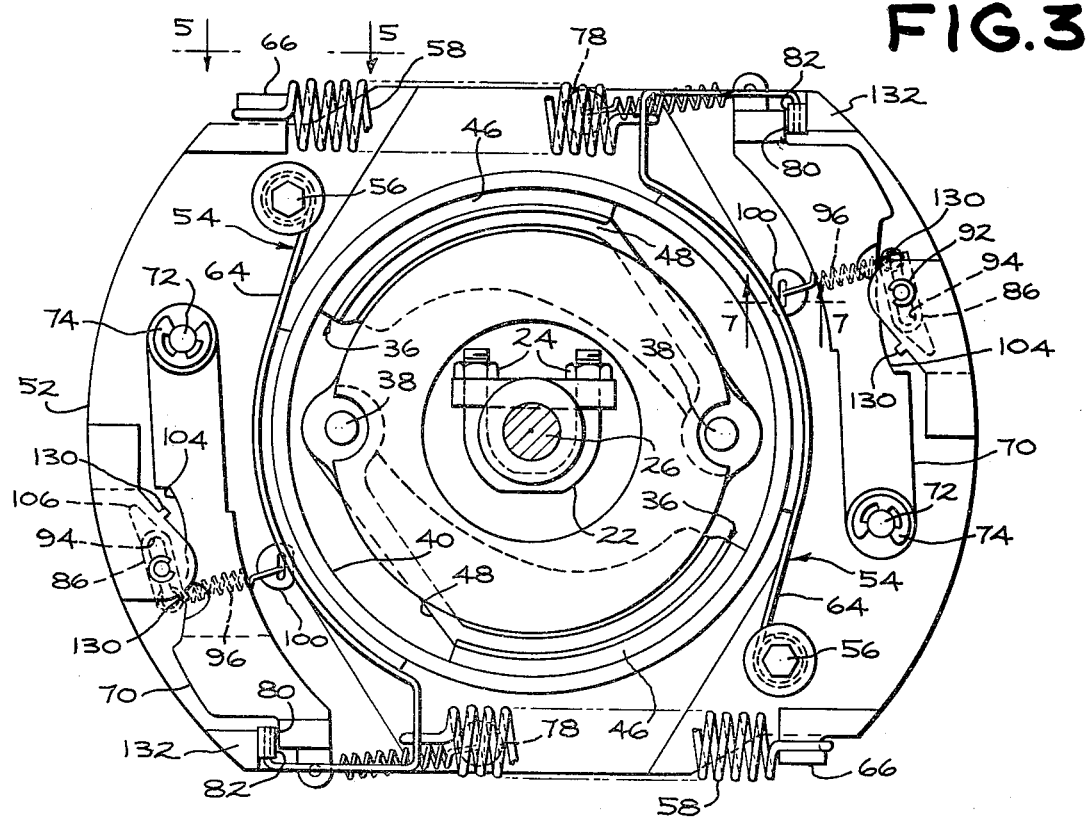
FIG. 3 is a view of the two-speed clutch system shown in FIG. 2, with the auxiliary weights released and moved into engagement with the secondary clutch shoes.

This condition is illustrated in FIG. 3 in which counter clockwise rotation of the pulley plate 52 has resulted in a clockwise movement of the triggers 86 after being struck by the engagement tab 128. This allows the auxiliary weights 70 and engagement surfaces 80 to be moved into engagement with the outer release tabs 82 and exert the disengagement pressure on the respective clutch shoe assemblies 54.

The dynamics of disengagement of the trigger 86 upon shifting to low speed operation is such that certain limit stops must be provided for both the triggers 86 and the auxiliary weights 70 to prevent malfunction. Specifically, a pair of fixed stops 130 are provided integral with the pedestal 90 which act to limit the extent of movement of each of the triggers 86 to 90° of rotation in either direction about the pivot pins 88. The force exerted by the auxiliary weights 70 upon initial release may be sufficient to cause a greater rotation of the trigger 86 which may cause and result in the trigger 86 impacting the engagement tab 128 and effecting the gap between the engagement tab 128 and the periphery of the pulley plate 52. This gap is critical since the radial position of the engagement tab 128 must be such as to remain completely clear of the protruding tail portions in the release position while moving inwardly just enough to insure solid contact with the tail portions 106 upon energization of the electromagnetic coil 126.

Accordingly, the fixed stops 130 provide a means for limiting the rotation of the triggers about their respective pivotal mounts upon shifting to low speed by impacting of the tail portions 106.

Similarly, upon initial release of the auxiliary weights 70, the inertia may be sufficient to momentarily cause movement of the free end of the auxiliary weights 70 to a position extending beyond the pulley plate 52 and similarly resulting in impacting the shifter arm 112 which thus could affect the critical gap.

Accordingly, a pair of stops 132 are provided which limit the radially outward movement of the auxiliary weights 70 by contacting the engagement surface 80 while allowing the limited outward radial movement sufficient to exert the disengagement pressure by engagement with the outer release tab 82. This point of engagement is such that the outermost portion of the auxiliary weights 70 is confined within the perimeter of the pulley plate 52.

Accordingly, in high speed operation, the electromagnetic coil 126 is de-energized and the engagement tab 128 maintained in its position away from the pulley plate 52 such that the triggers 86 are both maintained in position engaging the lateral surfaces 104 of the auxiliary weights 70. Thus, the drive from the output motor shaft 16 is transmitted into the primary clutch 18 gradually accelerating the inner drum 40, which inner drum 40 in turn drives the clutch shoe assemblies 54 which are maintained securely in frictional engagement therewith by the tension operating springs 58. The drive is thereby transmitted into the pivot pins 56 and the pulley plate 52 and thus the output pulley wheel 14 is driven at a one-to-one ratio to the input motor shaft 16.

The acceleration of the pulley plate 52 produces an initial radially outward movement of the auxiliary weights 70 and triggers 86 accommodated by the slots 94, such that the tail portions 106 protrude beyond the perimeter of the pulley plate 52.

Upon energization of the electromagnetic coil 126, the shifter arm 112 moves forward such that the engagement tab 128 successively strikes the tail portions 106 causing the triggers 86 to rotate about their pivots and allow the auxiliary weights 70 to move outwardly about their pivot pins 72. Contact of the engagement tabs 82 reduces the clutch torque capacity with increasing rotational speed, so that the rotational speed of the output of the pulley plate 52 is less than that of the output shaft 16.

Upon cessation of drive, the auxiliary weight return springs 76, as well as the trigger return springs 96, cause these components to reassume their position shown in FIG. 1.

As discussed above, the assembly of the operating springs, having relatively high spring rates in order to reduce the relatively heavy engagement pressure of the clutch shoe assemblies 54, can be difficult to assemble.

Accordingly, according to one aspect of the present invention, the mounting pedestals 66 are provided to render this assembly relatively simple. Each mounting pedestal 66 includes an upwardly protruding post with a rim portion 134 such as to provide an undercut 136 which accommodates the end loop 138 of the tension operating springs 58.

The rim portion 134 is provided with a notch or groove 140 which serves to anchor and guide an installation tool 142 which may be provided by any simple rod-like element such as a screwdriver, punch, etc. The tool 142 is passed into the inside of the end loop 138 and also the groove 140 and, upon extension of the tension operating spring 58, the loop is then cammed over the rim portion 134 and enables the tool 142 to be easily withdrawn.

Accordingly, the groove 140 serves to guide the position of the tool 142 on the pedestal 66 and provides a clearance space for ready withdrawal.

As also discussed above, the particular mounting arrangement for the auxiliary weight return springs 76 and the trigger return springs 96 provides a low cost mounting structure.

Accordingly, the anchoring boss 100 is cast integral with the pulley plate 52 with a slot 144 formed in the closed upper end portion of the anchoring boss 100. The slot 144 extends transversely to the general direction of extension of the spring 96 such that upon installation, end loop 146 can be inserted into the longitudinal slot 144 and thence rotated to be secured at its opposite end to the mounting tab 98 as shown in FIG. 1. This thus eliminates the need for a separate pin and machining of the anchoring boss 100, since the slot 144 can be simply cast in the anchoring boss 100. At the same time, this provides very secure retention of the end loop 146 of the spring 96 to thereby reduce the fabrication cost of the two-speed clutch system 10.

Accordingly, it can be seen that the use of a single secondary clutch 50 reduces the overall complexity of the two-speed clutch system 10 as well as reducing its overall depth, such as to enable the clutch system to be installed and assembled as a unit separately from the motor, since the U-clamp 22 may be located adjacent the output shaft 16. This reduction in depth also makes possible the addition of other control devices located intermediate the clutch assembly and motor, such as a neutral feature of centrifugal switch associated with the motor. This also eliminates the need for a separate relatively massive carrier plate and the use of two separate secondary clutches. At the same time, the relatively tight mounting of the clutch shoe assemblies 54 and the auxiliary weights 70, by virtue of their pivotal mounting, insures that the vibration level will be reduced to a minimum. The provision of positive stops 130 and 132 insure reliable operation of the clutch unit by limiting the movement of the trigger 86 and the auxiliary weights 70 during shifting from high speed to low speed operation such that malfunction which may otherwise occur is reliably prevented.

The resulting two-speed clutch system 10 exhibits all the necessary operational characteristics in that the torque responsive relationship and rotational speed enables the driving of a wide variety of loads without the danger of overload of the motor 12, and which operates in a highly reliable manner.

The embodiments of the invention in which an exclusive property or privilege is claimed are defined as follows:

1. A two-speed clutch comprising:
   a rotatably mounted input member;
   a rotatably mounted output member aligned with the input member;
   a clutch shoe assembly mounted on said output member, said clutch shoe assembly having one end thereof pivotally secured to the output member and the other end free and including a clutching surface carried by said free end engageable with said input member and movable into frictional clutching engagement with said input member upon radial inward movement about said pivotal securement;
   means biasing said clutch shoe into said frictional clutching engagement with said input member;
   an auxiliary weight mounted on said output member, said auxiliary weight having one end thereof pivotally secured to the output member and the other end free and movable in response to centrifugal force generated by rotation of said output member;
   means causing said auxiliary weight to come into engagement with a portion of said clutch assembly at the free end thereof upon rotation about said pivotal securement at said predetermined speed to exert a centrifugal force on said clutch shoe in a direction opposite said means biasing force to effect clutching surface slippage with respect to the input member upon development of sufficient disengagement force corresponding to the torque transmitted through said clutch;
   control means operable to alternatively restrain or free said auxiliary weight to move about said pivotal securement to either prevent or allow said movement, whereby said output member is driven either at the same speed of said input member or at said predetermined reduced speed.

2. The two-speed clutch according to claim 1 further including a positive stop engaging said auxiliary weight upon continued radial outward movement whereby said extent of radial movement of said auxiliary weight is limited to prevent said auxiliary weight from moving into the path of said shifter arm portion.

3. The two-speed clutch according to claim 1 wherein said control means includes a trigger pivotally mounted on said output member, said trigger having a nose portion movable into a position abutting said auxiliary weight and restraining said auxiliary weight from said radially outward movement when said trigger is in abutment therewith, and further including shifter means for causing said trigger to be rotated out of said position, whereby said auxiliary weight is released to allow engagement with said clutch shoe.

4. The two-speed clutch according to claim 3 wherein said trigger is formed with a tail portion extending radially outward from said nose portion in said one position and wherein said shifter means includes a shifter arm movable into position in which a portion thereof strikes said tail portion, rotating said trigger out of said position and further including positive stops limiting said rotation of said trigger means out of said one position, whereby said nose position cannot rotate into the path of said shifter arm portion.

5. The two-speed clutch according to claim 3 wherein said trigger is spring biased into said at least one position by means of a return spring connected to said trigger at one end thereof and connected to said output member at said other end.

6. The two-speed clutch according to claim 5 wherein said pivotal mounting of said trigger includes a pivot pin extending through a slotted opening, said slotted opening extending in a generally radially outward direction in said one position, whereby said trigger is allowed to move radially outward upon development of centrifugal force exerted by said auxiliary weight in engagement therewith and the weight of said trigger against the bias of said return spring.

7. The two-speed clutch according to claim 5 wherein said means mounting said one end of said extension spring to said output member comprises a boss formed integral with said output member, said boss having an internal opening thereof with a slotted opening at the upper end of said boss extending transversely to the direction of the extension of said return spring and wherein said spring is formed with an end loop adapted to be disposed into said slot.

8. The two-speed clutch according to claim 1 wherein said clutch shoe bias means comprises an operator spring affixed to said free end of said clutch shoe at one end thereof and extending to a pedestal connected to said output member.

9. The two-speed clutch according to claim 8 wherein said pedestal connected to said output member comprises a pedestal formed with an undercut wherein said operator spring is formed with an end loop extending into encircling relationship with said undercut and wherein said undercut is formed with an intermediate groove extending transversely to said undercut, whereby said end loop of said operator spring may be assembled onto said pedestal by means of a tool seated in said groove.

10. A two-speed clutch system comprising:
a rotatably mounted input member;
a rotatably mounted output member;
an inner drum rotatably mounted intermediate said input member and said output member;
a primary clutch establishing a driving connection between said input member and said inner drum, said primary clutch including at least one centrifugally engaged clutch shoe driven by said input member and forced into frictional engagement with said inner drum to establish a speed responsive increasing torque capacity of said driving engagement between said input member and said inner drum;
a secondary clutch establishing drive between said inner drum and said output member, said secondary clutch means including a clutch member pivotally mounted to said output member, and means establishing a clutching engagement of said clutching member and said inner drum in a first condition of said secondary clutch, said secondary clutch further including an auxiliary weight pivotally mounted on said output member, said auxiliary weight having one end thereof pivotally secured to the output member and the other end free and movable in response to centrifugal force generated by rotation of said output member;
means causing said auxiliary weight to come into engagement with a portion of said clutch assembly at the free end thereof upon rotation about said pivotal securement at said predetermined speed to exert a centrifugal force on said clutch member in a direction opposite said means biasing force to effect clutching surface slippage with respect to the input member upon development of sufficient disengagement force corresponding to the torque transmitted through said clutch;
control means operable to alternatively restrain or free said auxiliary weight to move about said pivotal securement to either prevent or allow said movement, whereby said output member is driven either at the same speed of said input member or at said predetermined reduced speed.

11. The two-speed clutch according to claim 10 wherein said control means includes a trigger pivotally mounted on said output member, said trigger having a nose portion movable into a position abutting said auxiliary weight and restraining said auxiliary weight from said radially outward movement when said trigger is in abutment therewith, and further including shifter means for selectively causing said trigger to be rotated out of said position, whereby said auxiliary weight is released to allow engagement with said clutch member.

12. The two-speed clutch according to claim 11 wherein said trigger is formed with a tail portion extending radially outward from said nose portion in said one position and wherein said shifter means includes a shifter arm movable into position in which a portion thereof strikes said tail portion, rotating said trigger out of said position and further including positive stops limiting said rotation of said trigger means out of said one position, whereby said nose position cannot rotate into the path of said shifter arm portion.

13. The two-speed clutch according to claim 10 further including a positive stop engaging said auxiliary weight upon continued radial outward movement, whereby said extent of radial movement of said auxiliary weight is limited to prevent said auxiliary weight from moving into the path of said shifter arm portion.

* * * * *